United States Patent [19]

Hirotsu et al.

[11] Patent Number: 4,701,682
[45] Date of Patent: Oct. 20, 1987

[54] CONTROL SYSTEM FOR MAINTAINING TRACTION OF ROLLING STOCK

[75] Inventors: Tetsuji Hirotsu; Hisakatsu Kiwaki; Kiyoshi Nakamura; Hiroshi Narita; Syozi Kasai; Akira Kimura; Yoshio Tsutsui, all of Katsuta, Japan

[73] Assignee: Hitachi, Ltd., Tokyo, Japan

[21] Appl. No.: 820,327

[22] Filed: Jan. 21, 1986

[30] Foreign Application Priority Data

Jan. 21, 1985 [JP] Japan .................................. 60-7538

[51] Int. Cl.$^4$ .............................................. B61C 15/08
[52] U.S. Cl. ...................................... 318/52; 180/197; 361/238; 364/426
[58] Field of Search ......................... 318/52; 180/197; 364/426; 361/238

[56] References Cited

U.S. PATENT DOCUMENTS

| | | | |
|---|---|---|---|
| 3,780,346 | 12/1973 | Gagnon | 361/238 |
| 4,035,698 | 7/1977 | Soderberg | 318/52 |
| 4,070,562 | 1/1978 | Kuno et al. | 364/426 |
| 4,075,538 | 2/1978 | Plunkett | 318/52 |
| 4,095,147 | 6/1978 | Mountz | 318/52 |
| 4,344,139 | 8/1982 | Miller et al. | 361/238 X |
| 4,347,569 | 8/1982 | Allen, Jr. et al. | 180/197 X |
| 4,583,611 | 4/1986 | Frank et al. | 180/197 |

Primary Examiner—William M. Shoop, Jr.
Assistant Examiner—Bentsu Ro
Attorney, Agent, or Firm—Antonelli, Terry & Wands

[57] ABSTRACT

From the peripheral velocity $v_M$ of a driving wheel and vehicle velocity v, the changing rate $\Delta v_s/\Delta t$ of the relative velocity $v_s$ therebetween with respect to time is obtained. The changing rate $\Delta f/\Delta t$ of the traction force f produced in the driving wheel at that time is obtained from a detected armature current of a motor driving the driving wheel. A driving torque produced by the motor is so controlled as to be decreased when polarities of the changing rate in the relative velocity and that in the traction force are different from each other.

8 Claims, 14 Drawing Figures

CONTROL SYSTEM FOR MAINTAINING TRACTION OF ROLLING STOCK

BACKGROUND OF THE INVENTION

1. Field of the Invention

The present invention relates to the improvement of a control system for the traction of rolling stock which serves to effectually utilize the adhesive force (frictional force) between wheels of the rolling stock and rails as the tractive or braking force.

2. Description of the Related Art

It is well known that, since vehicles on rails obtain their tractive or braking force from the friction between the wheels thereof and the rails, slipping or skidding of the wheels will occur if the driving or braking torque goes beyond a limited value defined by the coefficient of friction between the wheels and the rails. The slip occurring during power running is based on substantially a same phenomenon as the skid occurring at the time of braking. Thus, it should be possible to employ a single means as a way of preventing both. Accordingly, hereinafter, a description will be presented based on an example of the operation in the power running of an electric vehicle, and the especially different characteristics relative to the braking period will be described at the time needed.

In a conventional electric vehicle, operation of a re-adhesion control or traction recovery control is based on the way that slip is detected by the difference in velocity between a driving wheel and a trailing wheel or among a plurality of driving electric motors (hereinafter, simply referred to as a driving motor). Detection of such slip also includes the way of utilizing the electric signal indicating the above mentioned velocity difference, such as voltage, current or the like. When the velocity difference, the voltage difference or the like goes beyond a predetermined value, the driving torque is diminished.

However, these control methods result in the fact that a maximal adhesive force cannot be effectively utilized for the tractive force because of the following reason. In these control methods, a certain threshold for the velocity difference mentioned above is set in order to determined whether or not slip occurs, since there is a slight difference in the velocity between the driving wheel and the trailing wheel even during the normal running in which the driving wheel adheres to the rail and produces a tractive force. The threshold for the velocity difference, therefore, is selected at a relatively high value to such an extent that slip is not detected by the velocity difference during normal running, and is usually fixed at such a value. Further, there is the following relationship between the traction force and the velocity difference mentioned above. Namely, as the traction force increases, the velocity difference also increases, until the traction force reaches its maximal value which is limited by a well known adhesive force determined by a friction coefficient between the driving wheel and the rail and the axle weight of the driving wheel. When the traction force exceeds a maximal value, it decreases as the velocity difference increases. The maximal traction force limited by the adhesive force varies in accordance with the friction coefficient of the rail, i.e. the state of surface of the rail. Accordingly, the velocity difference corresponding to the maximal traction force also varies. Although it is desired to drive the vehicle with a maximal traction force, that is, with the velocity difference at which the maximal traction force is effected, this is very difficult, since the threshold is fixedly determined as stated above in spite of a variation in the velocity difference at which the traction force becomes a maximum. Consequently, the maximal adhesive force can not be effectively utilized for the traction force.

Furthermore, there is a method in which the vibration inherent in the system composed of the wheels and the wheel shaft, which is generated during slip, is detected and the driving-wheel driving torque is controlled so as to hold the vibration below a predetermined value ("ASEA Journal" Vo. 48, No. 6, 1975, pp. 147-149). However, in this method, there exists the disadvantage that the generation of the inherent vibration depends upon the state of the driving wheel and the surface of the rail as will be understood from, for example, the fact that it is not likely to be generated when the wheel and the rail are wet, and the signal required for the control is not often obtained. Moreover, since the generation of inherent vibration also depends upon the structure of a driving device for the electric vehicle or the system of a main circuit, the generating conditions vary, and it is difficult to predict these generating conditions. Accordingly, it is difficult to design the control device. In addition, when generating the inherent vibration, since the inherent vibration is generally generated only when the velocity difference goes beyond the point of the maximal traction force and it goes beyond a certain degree, the method described above can be referred to as traction recovery control which has the function of detecting the already-caused slip and then accomplishing re-adhesion of the slipping wheel, so that it is also difficult to utilize the maximal adhesive force in this method.

Moreover, as another example, an electric vehicle having the following function is known. The function is that of detecting vehicle velocity v and armature current $I_M$, assuming an allowable value $\Delta v$ of the velocity difference, computing a terminal voltage $E + \Delta E$ under a peripheral velocity $v + \Delta v$ of the driving wheel and the armature current $I_M$, setting the resultant as a standard value of the terminal voltage of the electric motor, comparing the standard value $E + \Delta E$ with the actual voltage $E_a$ of the electric motor terminal and allowing the velocity difference of the driving wheel to increase to $\Delta v$ by means of diminishing a voltage applied to the electric motor when $E_a$ goes beyond $E + \Delta E$. This allowable value $\Delta v$ of the velocity difference is variable and the value $\Delta v$ is arranged so as to make the armature current maximal on the basis of the change of the armature current (ASME '80 Winter Annual Meeting paper 80-WA/RT-3). However, in this method, it is possible to arrange $\Delta v$ to be at an optimal value only in the case of changing the armature current only by means of $\Delta v$. In fact, the armature current varies due to factors other than $\Delta v$, such as a variation in the degree of the traction force on the basis of the variation of the rail surface state, the variation of running resistance due to a slope, wind and the like. Thus, in this method, it is quite difficult to effectually utilize the maximal traction force.

SUMMARY OF THE INVENTION

It is an object of the present invention to provide a traction control system for rolling stock which serves to employ the adhesive force creating by the friction between rails and wheels more effectively for power running as well as braking of vehicles.

A feature of the present invention is in that the adhesive force resulting from the friction between the rails and the wheels is effectively utilized by detecting the relative velocity between a peripheral velocity of the wheel and a vehicle velocity or a relative-velocity related value and a traction or braking force produced by the wheel at that time or a traction or braking force related value, obtaining changing rates of relative velocity and the traction or braking force which are respectively vary with respect to time and controlling a driving or braking torque applied to the wheel in response thereto.

Namely, the present invention utilizes the fact, for example, that a changing rate $df/dv_s$ of the traction force f with respect to the relative velocity $v_s$ is zero at the value of the relative velocity which provides the maximal traction force $f_{max}$. Therefore, it is possible to increase the driving torque as occasion demands in the positive region of $df/dv_s$. Further, in the negative region of $df/dv_s$, the relative velocity is stably controlled so as to be at the velocity where the maximal traction force $f_{max}$ is always obtained by means of forcibly diminishing the driving torque.

BRIEF DESCRIPTION OF THE DRAWINGS

FIGS. 1a–1c are diagrams for explaining the present invention, in which FIG. 1a illustrates the relation of acting and reacting forces between a wheel and a rail during running of the wheel, FIG. 1b shows the relation between traction force f and relative velocity $v_s$ (between a peripheral velocity $v_M$ of the wheel and a vehicle velocity v) and FIG. 1c shows a change in the changing rate $df/dv_s$ of the traction force with respect to the relative velocity $v_s$;

DESCRIPTION OF THE PREFERRED EMBODIMENTS

Figure 1A:
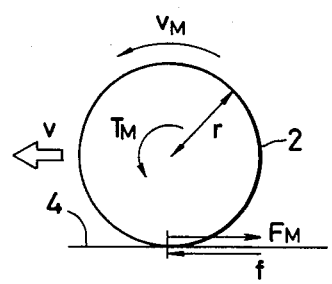

FIG. 1a is a diagram for explaining the relation of active and reactive forces between a wheel and a rail. In this figure, reference numerals 2 and 3 denote a wheel and the surface of a rail on which the wheel runs, respectively. A reference character $T_M$ denotes a driving torque applied to the wheel 2 by a driving motor, for example. In this case, the driving torque $T_M$ can be adjusted by controlling the motor current of the driving motor. Reference characters $v_M$ and v indicate the peripheral velocity of the wheel 2 and the vehicle velocity, respectively, the former being able to be detected by measuring the rotational speed of an axle of the wheel 2 and the latter by measuring that of an axle of a trailing wheel which is not driven by a driving motor and hence never slips. A reference character $F_M$ denotes a peripheral driving force caused by the driving torque $T_M$. As is well known, the peripheral driving force $F_M$ is given by $T_M/r$, where r represents the radius of the wheel 2. A reference character f indicates a traction force which appears between the wheel 2 and the rail 4 as a reactive force of the peripheral driving force $F_M$ in dependence upon the friction therebetween. Accordingly, as the peripheral driving force $F_M$ increases, the traction force f also increases, however the maximal value $f_{max}$ of the traction force f is limited by a well known adhesive force which is represented by $\mu^W$, wherein $\mu$ indicates the friction coefficient between the wheel 2 and the surface of the rail 4 and W the axle load of the wheel 2.

By the way, when a certain traction force f occurs, there is a slight difference in the velocity between the peripheral velocity $v_M$ of the wheel 2 and the vehicle velocity v. The velocity difference $v_s(=|v_M-v|)$, called a relative velocity, hereinafter) increases with increase of the traction force f, until the traction force f reaches its maximal value $f_{max}$. Thereafter, even through the driving torque $T_M$ is increased, the traction force f decreases, resulting in that only the relative velocity $v_s$ increases. Namely, the relation between the traction force f and the relative velocity $v_s$ becomes as shown in FIG. 1b.

As will be understood from this figure, although the state that the traction force f increases with increase of the relative velocity $v_s$ is generally called "adhesive state" of the driving wheel, actually a very small amount of slippage takes place (the zone of this state is represented as a zone A for the purpose of convenience of explanation, hereinafter). The state in the zone A is usually called a creep state. On the other hand, a zone in which the traction force f decreases with an increase in the relative velocity $v_s$ is represented by a reference character B, and the state in this zone is usually called the slip in a case of power running and a skid in a case of braking.

As stated above, the maximal traction force $f_{max}$ is limited to the adhesion force determined by the friction coefficient $\mu$ if the axle load W of the wheel 2 does not change. Therefore, the maximal traction force $f_{max}$ depends on the condition of the surface of the rail 4 to a great extent. If the surface of the rail 4 is wet, the maximal value $f_{max}$ (wet) becomes smaller than that $f_{max}$ (dry) when the surface of the rail 4 is dry, as shown by a dotted line in FIG. 1b.

Figure 1B:
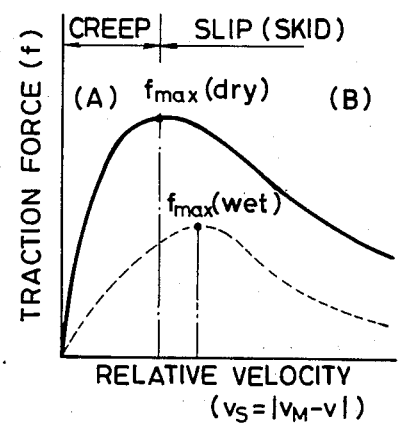
Figure 1C:
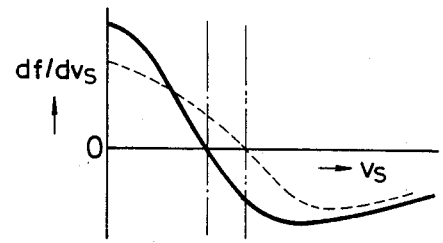

In any case, however, the whole operating zone can be divided into the zone A where, with an increase in the relative velocity $v_s$, the traction force f is increased and the zone B where the traction force f is diminished as the relative velocity $v_s$ increases, as shown in FIG. 1b. Accordingly, a changing rate $df/dv_s$ of the traction force f with respect to the relative velocity $v_s$ is as shown in FIG. 1c. As is apparent from FIGS. 1b and 1c, the changing rate $df/dv_s$ becomes zero at a point of the relative velocity $v_s$ where the traction force f reaches its maximal value $f_{max}$.

Here, the traction force f can be obtained by the following equation;

$$f = \frac{T_M}{r} - \theta \frac{\dot{v}_M}{r^2} \quad (1)$$

wherein $\theta$ is the moment of inertia of a whole driving system converted into a driving axle and $\dot{v}_M$ is a primary differential value $dv_M/dt$ (a peripheral acceleration of a wheel). Accordingly, since the moment of inertia $\theta$ and the radius r of the wheel are constant, it is possible to obtain the traction force f in accordance with the equation (1) after obtaining the driving torque $T_M$ from the armature current $I_M$ of the driving motor and computing a differential value $v_M$ of the detected peripheral velocity $v_M$ of the driving wheel. In one preferred embodiment, the driving torque $T_M$ can be controlled so as to reduce the changing rate $df/dv_s$ to zero on the basis of the traction force f obtained in accordance with the formula (1) and the calculated relative velocity $v_s$. Thus, it is possible to employ the maximal adhesive force as the traction force and the braking force more effectually.

Figure 2:
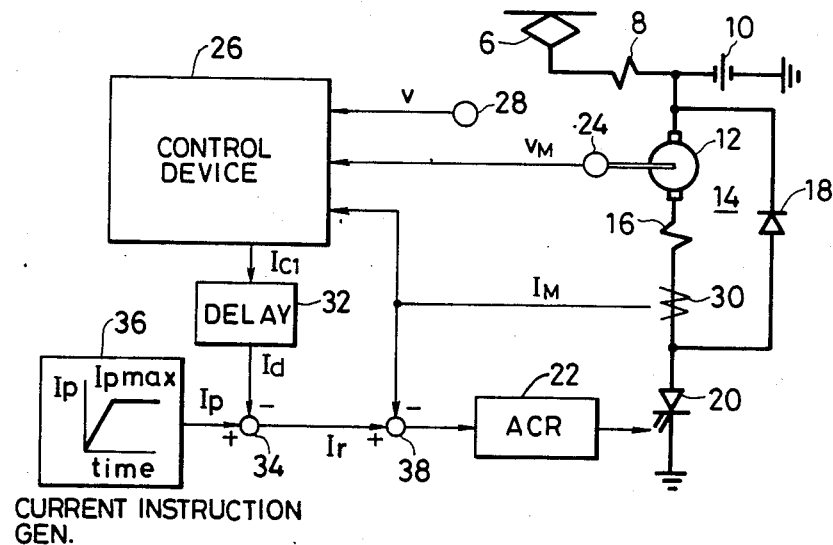
FIG. 2 schematically shows an arrangement of an embodiment of the present invention which is applied to a chopper control electric vehicle.

Referring now to FIG. 2, description will be made of a control system for maintaining traction in a rolling stock according to an embodiment of the present invention. FIG. 2 shows an example in which the control device according to the present invention is applied for a so called chopper-control electric locomotive. In this figure, a reference numeral 6 denotes a pantagraph, 8 a reactor, and 10 a capacitor which forms a filter together with the reactor 8. A reference numeral 12 denotes the armature of an electric driving motor 15, and 16 denotes a series-wounded field winding of the motor 14. A reference numeral 18 denotes a free wheel diode and 20 denotes a chopper composed of a semiconductor switch such as a thyristor. The duty ratio of the on-off operation of the chopper 20 is controlled by the output of an automatic current regulator 22 (abbreviated as ACR, hereinafter) so as to control the voltage applied to the motor 14. The peripheral velocity $v_M$ of the driving wheel driven by the motor 14 is detected by, for example, a tachogenerator 24 mounted on the axle of the driving wheel and then is coupled to a control device 26. The vehicle velocity v corresponds to the velocity of a vehicle in relation to ground and is detected by, for example, a tachogenerator 28 mounted on the axle of a wheel having no driving motor and is coupled into the control device 26. Further, the armature current $I_M$ of the driving motor 14 is detected by a current transformer 30 and is coupled to the control device 26. The control device 26 serves to accomplish the operation for obtaining a control signal for making the traction force maximal as described later by using the peripheral velocity $v_M$ of the driving wheel, the vehicle velocity v and the armature current $I_M$ and to generate a control signal $I_{CI}$ as the operation result. The control signal $I_{CI}$ is coupled to a delay element 32 whose time constant is considerably small for an increasing input and comparatively large for a diminishing input.

Figure 3:
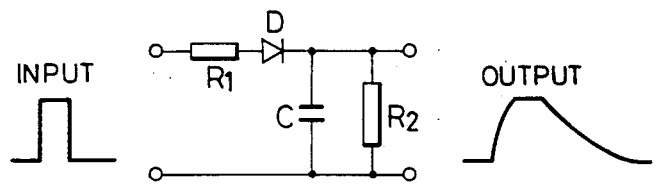
FIG. 3 shows an example of a delay element used in the arrangement shown in FIG. 2.

Such a delay element 32 can be realized, for example, by a circuit as shown in FIG. 3. In this figure, $R_1$ is a resistor for providing a time constant at the time of increasing the input (resistance value is $R_1$). D denotes a diode for inhibiting the discharge toward the input side. $R_2$ denotes a discharge resistor (resistance value is $R_2$) of a capacitor C (capacitance is C). In order to simplify the description, there is a condition that the output impedance of the signal source is zero, the load impedance is infinity and the diode is an ideal diode. In this case, with regard to the input and output characteristic, the time constant $\tau_1$ of the output voltage increase, when the input voltage is increased, is $R_1C$ and the time constant $\tau_2$ of the output voltage decrease, when the input voltage is decreased, is $R_2C$. Thus, $\tau_1$ is made smaller and $\tau_2$ is made larger by making $R_1$ relatively small and making $R_2$ relatively large. According to a desirable example, $\tau_1$ is set at 0.1 sec. and $\tau_2$ at 0.5 sec.

Referring back to FIG. 2, an output $I_d$ of the delay element 32 is coupled to a subtracter 34. The subtracter 34 serves to obtain the deviation $I_p - I_d$ between a current instruction $I_p$ of the output of a current instruction generator 36 and the output $I_d$ of the delay element 32. A subtracter 38 serves to obtain the deviation $(I_p - I_d) - I_M$ between the output $I_p - I_d$ of the subtracter 34 and the armature current $I_M$. The output of the subtracter 38 is input to the ACR 22. The ACR 22 serves to control the duty ratio of the chopper 20 in response to the input. Consequently, the armature current $I_M$ is controlled to be a value corresponding to the difference $I_p - I_d$ between the current instruction $I_p$ and the output $I_d$ of the delay element 32 and thus the torque produced by the driving motor 14, that is, the driving torque of the driving wheel is controlled.

The current instruction $I_p$, as is illustrated in the current instruction generator 36, increases at a suitable rate until it reaches $I_{pmax}$ corresponding to a current-limit value and is maintained constant thereafter.

Figure 4:
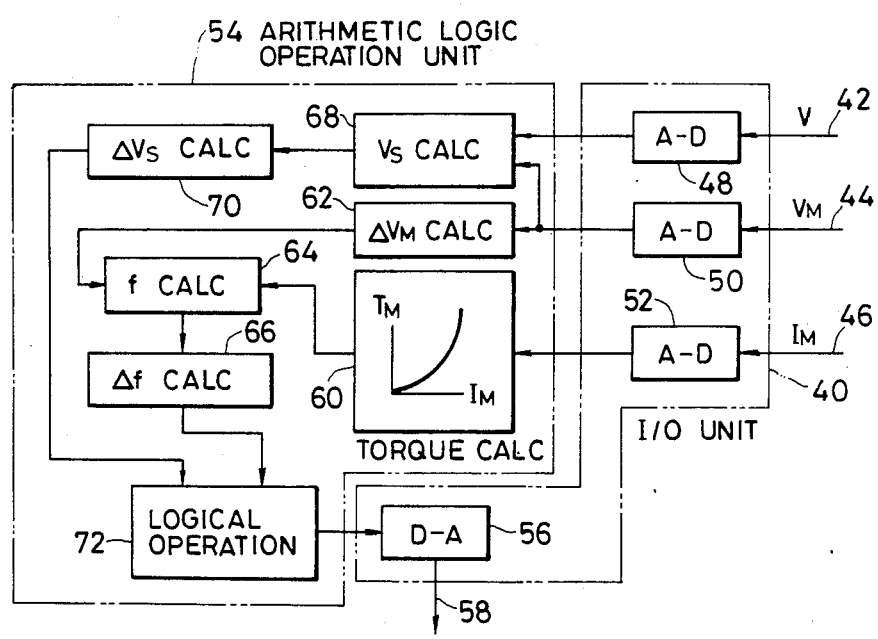
FIG. 4 is a functional block diagram of a control device utilized in the arrangement shown in FIG. 2.

Next the control device 26 will be described, referring to FIG. 4. The control device 26 is composed of a computer system and an input/output device (abbreviated as I/O device, hereinafter). The computer system has, as usual, a processor unit, a read only memory (ROM) which stores programs and various kinds of constants necessary for operation in the processor, a random access memory (RAM) which temporarily stores input data for calculation and output data as an operation result of the processor and buses connected thereamong. The I/O device is formed mainly by converters, a part of which converts analog signals into digital signals which can be processed within the processor (these converters are called A-D converters) and the remaining portion converts digital signals as an operation result into analog signals for control (these converters are called D-A converters). FIG. 4, however, does not illustrate the control device 26 in the form of a concrete hardware, but shows it as a functional block diagram, in which the control device 26 is divided into an arithmetic logic operation unit and an I/O unit.

The I/O unit 40 serves to receive the vehicle velocity v through a line 42, the peripheral velocity $\dot{v}_M$ through a line 44 and the armature current $I_M$ through a line 46 and to convert them into digital signals by means of A-D converters 48 to 52 therein and then to couple these signals to the arithmetic logic operation unit 54. Further, the unit 40 also serves to convert the output of the operation unit 54 into an analog signal by means of a D-A converter 56 and to generate the control signal $I_{CI}$ through a line 58. Next, the content of the operation accomplished in the operation unit 54 will be described together with a functional block shown in the same figure. A torque calculation unit 60 stores the relation between the armature current $I_M$ and the torque $T_M$ in the memory and serves to calculate the driving torque $T_M$ in relation to the armature current $I_M$. A $\Delta v_M$ calculation unit 62 serves to compute $\Delta v_M/\Delta t$ corresponding to $\dot{v}_M$ on the basis of the peripheral velocity $v_M$ of the driving wheel. Herein, $\Delta t$ denotes a sampling period and $\Delta v_M$ denotes the difference of the peripheral velocity $v_M$ between the sampling periods $\Delta t$. Accordingly, by making $\Delta t$ sufficiently small, $\Delta v_M/\Delta t$ can be regarded as being equal to $\dot{v}_M$. An f calculation unit 64 serves to calculate the traction force f on the basis of the driving torque $T_M$ and $\Delta v_M/\Delta t$ obtained in advance in accordance with the formula (1). A $\Delta f$ calculation unit 66 serves to obtain the difference $\Delta f$ of the traction force f between the sampling periods $\Delta t$. A $v_s$ calculation unit 68 serves to compute the difference between the peripheral velocity $v_M$ and the vehicle velocity v so as to obtain a relative velocity $v_s$. A $\Delta v_s$ calculation unit 70 serves to calculate a difference $\Delta v_s$ of the relative velocity $v_s$ between the sampling periods. These differences $\Delta v_M$, $\Delta f$ and $\Delta v_s$ should not be limited to the difference during one sampling period (primary difference) as described above. There is considered the method that the difference is made to be an average value of the differences sampled during some periods. As a result, it is possible to remove the influence of noise resulting from an exceptionally abnormal value for a certain sampling period. A logical operation unit 72 serves to accomplish the logical operation described below by means of the difference $\Delta f$ of the traction force f and the difference $\Delta v_s$ of the relative velocity $v_s$. The output signal of the logical operation unit 72 is D-A converted and the control signal $I_{CI}$ is coupled through the line 58 as the output of the control device 26.

Figure 5:
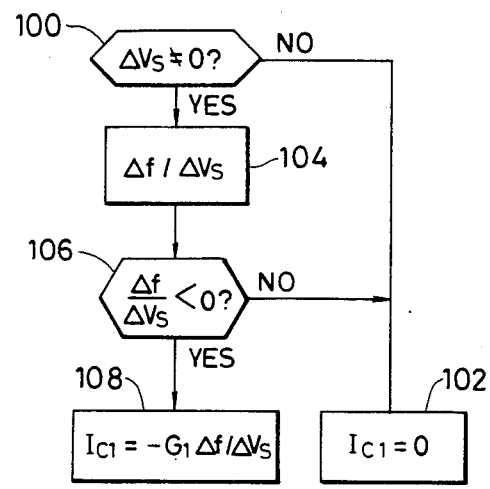
FIG. 5 is a flow chart showing an example of the operation of a logical operation unit included in the control device shown in FIG. 4.

FIG. 5 is a flow chart showing one example of the logical operation of the operation unit 72. At first, there is accomplished at a step 100 the discrimination as to whether or not $\Delta v_s$ is zero. If $\Delta v_s$ is zero, i.e. when the answer of the step 100 is negative, the operation jumps to a step 102, wherein the logical operation unit 72 (FIG. 4) produces the control output corresponding to $I_{CI}=0$. Therefore, the signal coupled through the line 58 becomes zero, so that the output $I_d$ of the delay element 32 (FIG. 2) is zero. As a result, the output $I_p$ of the current instruction generator 36 becomes the instruction of the armature current $I_M$ of the driving motor 14, as is. Namely, where the differentiated value $\Delta v_s$ of the relative velocity $v_s$ (relative acceleration) is zero, the reference signal for the armature current control system which is composed of the chopper 20, the ACR 22, the subtracter 38 and the current transformer 30 is not changed, since the driving wheel continues stable running with the relative velocity $v_s$ kept constant.

If $\Delta v_s$ is determined to be non-zero as a result of the discrimination at the step 100, the operation proceeds to a step 104, in which the changing rate $\Delta f/\Delta v_s$ is calculated. Thereafter, at a step 106 is determined whether $\Delta f/\Delta v_s$ is negative or not. If the answer in the step 106 is negative, i.e. when $\Delta f/\Delta v_s$ is positive or zero, the operation jumps to the step 102 and the control output $I_{CI}$ is made zero similarly to the case where $\Delta v_s$ is zero. Also in this case, the current instruction $I_p$ becomes the reference signal for the armature current control system without any change. Further, the fact that $\Delta f/\Delta v_s$ is positive means that the running state of the driving wheel is in the condition of the zone A shown in FIG. 1b, that is to say the creep state is maintained.

When the relation $\Delta f/\Delta v_s<0$ is established, the operation goes to a step 108, in which $-G_1 \cdot \Delta f/\Delta v_s$ is coupled as the control output $I_{CI}$ from the control device 26, wherein $G_1$ denotes a positive constant indicative of a gain. In this case, the running state of the driving wheel is in the condition of the zone B shown in FIG. 1b. Namely, the driving wheel continues to slip with a large relative velocity $v_s$. As the control output $I_{CI}=-G_1 \cdot \Delta f/\Delta v_s$ is produced, the current instruction $I_p$ is reduced by the amount corresponding to $-G_1 \cdot \Delta f/\Delta v_s$, so that the driving torque $T_M$ is decreased. Consequently, the running state of the driving wheel in the zone B shown in FIG. 1b goes toward the condition in the zone A.

As explained above, only in the zone B shown in FIG. 1b, is the control output $I_{CI}$ given a positive value in proportion to $|\Delta f/\Delta v_s|$ and in the other conditions, the control output $I_{CI}=0$. Accordingly, in the zone A shown in FIG. 1b, the driving force $F_M$ ($=T_M/r$) is increased as time passes in response to the current instruction $I_p$ and the traction force f is increased in response to the driving force $F_M$. However, when the driving force $F_M$ is made larger than the maximal traction force $f_{max}$, as in the zone B shown in FIG. 1b, then a positive polarity signal in proportion to $|\Delta f/\Delta v_s|$ is generated as the control output $I_{CI}$, the output of the subtracter 34 (FIG. 2), is diminished, the driving torque $T_M$, that is, the driving force $F_M$ is diminished and the relative velocity $v_s$ is reduced. As explained above, the driving torque is controlled so as to make the traction force f closer to the point of its maximal value $f_{max}$ in both of the zones A and B shown in FIG. 1b.

However, when the value of the maximal traction force $f_{max}$ is sufficiently large, as is often the case with a dry rail surface, compared with the traction force f required at that time, the running of the driving wheel is accomplished only in the zone A shown in FIG. 1b. Thus, after the current instruction $I_p$ reaches the maximal value $I_{pmax}$, the electric vehicle is driven by a constant driving torque $T_M$ corresponding to $I_{pmax}$.

Moreover, in the zone B shown in FIG. 1b, when the relative velocity $v_s$ changes from the increasing state to the decreasing one, the relative velocity difference $\Delta v_s$ becomes zero and thus the control output $I_{CI}=0$ (cf. FIG. 5). Thus, the delay element 32 has a function of continuously changing the output $I_d$ of the delay element 25. However, since such a state (means $\Delta v_s=0$ in the zone B) continues for a very short time, the delay element 32 is not necessarily required. No problem is caused without the delay element 32, since the armature current $I_M$ is not abruptly changed by virtue of the inductance of driving motor windings and the delay existing in the ACR 22.

Further, in the embodiment shown in FIG. 5, when $\Delta f/\Delta v_s<0$, $I_{CI}=-G_1 \cdot \Delta f/\Delta v_s$, but the control output $I_{CI}$ should not be so defined. It can employ any signal which serves to decrease the driving torque $T_M$. For example, the following signals can be considered.

(1) $I_{C1}=G_2 \cdot v_s$ (in proportion to the relative velocity $v_s$)

(2) $I_{C1}=G_3 \cdot |\Delta v_M|$ (in proportion to the absolute value of the difference $\Delta v_M$ of the peripheral velocity of the driving wheel)

(3) $I_{C1}=G_4 \cdot |\Delta v_s|$ (in proportion to the absolute value of the difference $\Delta v_s$ of the relative velocity)

(4) $I_{C1}=G_5 \cdot |\Delta f|$ (in proportion to the absolute value of a difference $\Delta f$ of the traction force)

(5) $I_{C1}=C_1$ (constant value), and (6) $I_{C1}=\alpha I_p$ ($\alpha$ is a constant)

Herein, $G_1$, $G_2$, $G_3$, $G_4$, $G_5$ are respectively positive constants indicative of gain. However, in order to realize the above cases (1), (2) and (6), the arrangement of FIG. 2 or FIG. 4 is required to be somewhat modified as is understood from, for example, the fact that the control device 26 is required to receive in the output of the current instruction generator 36 in a case of employing the current instruction $I_p$ for $I_{C1}$ (the above (6)). Since the modifications are obvious to one ordinarily skilled in the art, further description is omitted.

Further, when running, the vehicle produces an undesired vibration, which causes an erroneous operation of the control device 26. In order to prevent this, a suitable margin value $\delta$ (positive constant) can be provided for the discrimination operation in the step 106 of the flow chart shown in FIG. 5. Namely, if the relation $\Delta f/\Delta v_s < -\delta$ is established in the step 106, the control output $I_{C1}$ as described above is provided.

In the description of the embodiment described above, there is the condition that the state of the rail surface varys only slightly, so that the relation between the relative velocity $v_s$ and the traction force f is expressed by a single characteristic line as shown by the solid line in FIG. 1b. Next, there is considered the case where a rail surface is changed from wet to dry as the vehicle runs. Namely, when driving is carried out at the $f_{max}$ (wet) point of a dotted line in FIG. 1b, the state of the rail surface is changed to the dry state, so that the relation between the relative velocity $v_s$ and the traction force f is changed to conform to the solid line. In this case, ideally the driving torque $T_M$ is rapidly increased toward the $f_{max}$ (dry) point of the new maximal traction force. However, in such a case, since the relations $\Delta f>0$ and $\Delta v_s<0$ are temporarily established, $\Delta f/\Delta v_s<0$ is given. Thus, in the embodiment described before, the driving torque $T_M$ is temporarily decreased. To correct this, it is necessary to check not only the polarity of $\Delta f/\Delta v_s$ but also the polarity of each of $\Delta f$ and $\Delta v_s$.

Figure 6:
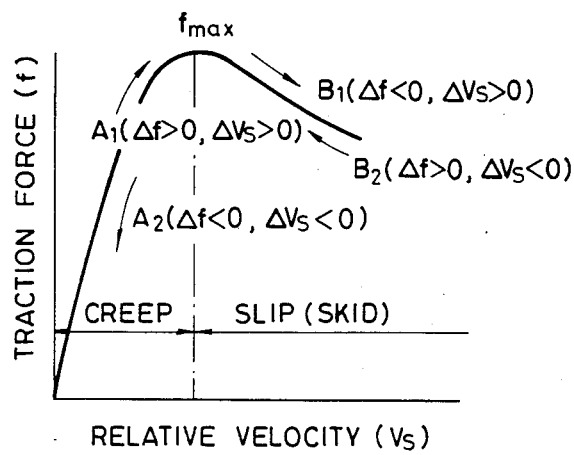
FIG. 6 shows the relation between the traction force f and the relative velocity $v_s$, by which detailed analysis is explained with respect to the phenomena caused during running of the driving wheel.

FIG. 6 shows state modes in the relation between the relative velocity $v_s$ and the traction force f (the state of changes of the relative velocity $v_s$ and the traction force f). There are four modes of state $A_1$, $A_2$, $B_1$ and $B_2$ in accordance with the polarities of $\Delta f$ and $\Delta v_s$.

The mode $A_1$ stays in the zone A shown in FIG. 1b where the traction force f is increased up to $f_{max}$ and the relative velocity $v_s$ is also increased. Thus, the relations of $\Delta f>0$ and $\Delta v_s>0$ are established and the driving torque $T_M$ can be increased so as to approximate to the $f_{max}$ point. The mode $B_1$ means the state that the traction force f rapidly passes through the $f_{max}$ point and into the zone B. In this state, since the traction force f is decreased and the relative velocity $v_s$ is increased, the relations $\Delta f<0$ and $\Delta v_s>0$ are established. Thus, the driving torque $T_M$ is required to be abruptly reduced because it is preferable that the relative velocity $v_s$ in the zone B is reduced to the minimum possible. The mode $B_2$ shows the state when the relative velocity $v_s$ is reduced as a result of abruptly reducing the driving torque $T_M$ in the $B_1$ mode. In this mode $B_2$, it is necessary to diminish the relative velocity $v_s$. In order to diminish the relative velocity $v_s$, the peripheral velocity $v_M$ should be diminished. Herein, for studying the behavior of the peripheral velocity of the driving wheel, and the following formula is given by transforming the formula (1):

$$\theta \frac{\dot{v}_M}{r^2} = \frac{T_M}{r} - f \qquad (2)$$

From the formula (2), it can be understood that the periperal driving force $F_M(=T_M/r)$ of the driving wheel must be made smaller than the traction force f in order to reduce the peripheral velocity $v_M(\dot{v}_M<0)$. In the mode $B_2$, the traction force f is increased with reduction of the relative velocity $v_s$. Thus, if the driving force $F_M(=T_M/r)$ satisfies the relation of $T_M/r<f$, it can be increased with the decrease of the relative velocity $v_s$. In other words, in the mode $B_2$, since the relative velocity $v_s$ decreases with time passes, the driving force $F_M(=T_M/r)$ can be increased if it has the relation $T_M/r<f$. The above described control of the driving force in the mode $B_2$ can be realized by, for example, the making the control output $I_{C1}$ equal to zero when the difference $\Delta v_s$ of the relative velocity is changed from positive to negative and making the time constant $\tau_2$ at the diminishing time of the input signal of the delay element 32 a properly increased value. Lastly, the mode $A_2$ means the state that the relative velocity $v_s$ passes over the zone B and is diminished into the zone A. In this mode, $\Delta f<0$ and $\Delta v_s<0$ and thus the driving torque $T_M$ is increased.

In view of the above stated studies, it will be understood that only the case of the mode $B_1$, that is, $\Delta f<0$ and $\Delta v_s>0$ has the necessity of positively supplying the control output $I_{C1}$ for reducing the driving torque $T_M$. By meeting this necessity, there can be solved the problem in the embodiment mentioned above, that the driving torque $T_M$ temporarily diminishes when the state of the rail surface is changed from wet to dry, because, in such a case, the relations of $\Delta f>0$ and $\Delta v_s<0$ are given similarly with the mode $B_2$ and in this case the control output $I_{C1}=0$ and thus the driving torque $T_M$ is increased in accordance with the current instruction $I_p$.

Figure 7:
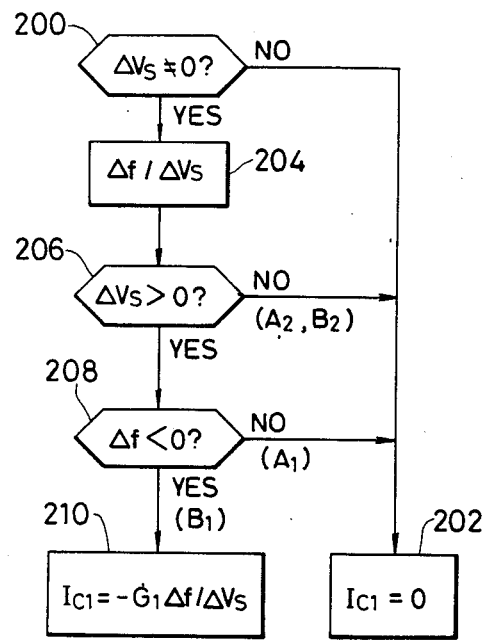
FIG. 7 is a flow chart showing another example of the operation of the logical operation unit included in the control device shown in FIG. 4 in accordance with the detailed analysis of the running state of the wheel shown in FIG. 6.

FIG. 7 shows another example of the logical operation of the operation unit 72 (FIG. 4) in accomplishing the improved control as above-stated. As is understood from this figure, only when the relations $\Delta f<0$ and $\Delta v_s>0$ are established, i.e. only in the mode $B_1$, the control output $I_{C1}=-G_1 \cdot \Delta f/\Delta v_s$, and in all the other cases, is the control output $I_{C1}$ equal to zero. Also in this example, the control output $I_{C1}$ when $\Delta f<0$ and $\Delta v_s>0$ should not be limited to $-G_1 \cdot \Delta f/\Delta v_s$. It can employ any signal for diminishing the driving torque $T_M$. Examples of the signals (1) to (6) described in connectin with FIG. 5 will be applied to this case.

Figure 8:
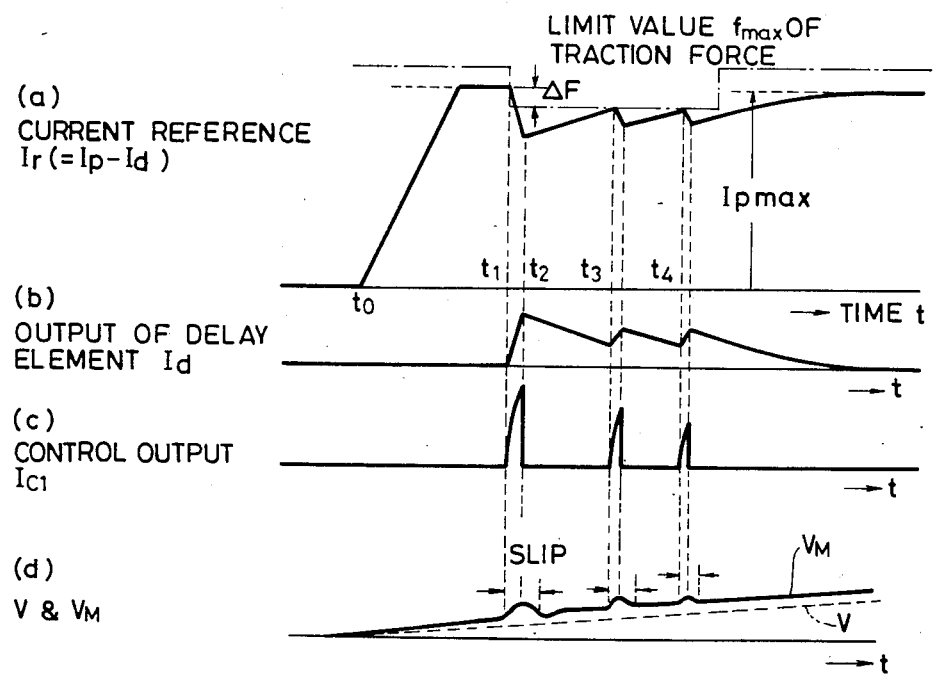
FIG. 8 is a set of timing diagrams showing the operation of the embodiment shown in FIG. 2.

FIG. 8 shows one example of changes in the reference $(I_p-I_d)$ for the driving motor control system (FIG. 8 (a)), the output signal $I_d$ of the delay element 32 (FIG. 8(b)), the control output $I_{C1}$ of the control divice 26 (FIG. 8(c)) and the vehicle velocity v and the peripheral velocity $v_M$ of the driving wheel (FIG. 8(d)) with respect to time t, when the embodiment is operated in accordance with the logical operation of the flow chart shown in FIG. 7. Further, although the changes as shown in FIG. 8 can be also indicated with respect to the running distance of the vehicle, time is the abscissa for convenience of explanation.

Referring to FIG. 8, it is assumed that the limit value of the traction force $f_{max}$ is sufficiently large when the vehicle starts at a time point $t_0$. The reference $I_p-I_d$ for the driving motor control system is increased up to the maximal value $I_{pmax}$ in accordance with an increase in the current instruction $I_p$, as shown in FIG. 8(a). During the normal running with the armature current $I_M$ corresponding to the maximal current instruction $I_{pmax}$, if the condition of the rail surface deteriorate and the limit value $f_{max}$ of the traction force is lowered at a time point $t_1$ as shown by a one-dot chain line in FIG. 8(a), slippage of the driving wheel occurs and the relative velocity $v_s$ between the vehicle velocity v and the peripheral velocity $v_M$ of the driving wheel increases as shown in FIG. 8(d). The driving wheel enters into the running state of the mode $B_1$ shown in FIG. 6. During the state of this mode, the control device 26 produces the control output $I_{C1}$ as shown in FIG. 8(c). Consequently the delay element 32 delivers the signal $I_d$ as shown in FIG. 8(b). As a result, the reference $I_p-I_d$ for the driving motor control system is rapidly reduced, as shown by the solid line in FIG. 8(a), and the driving force $F_M$ is weakened, so that the peripheral velocity $v_M$ starts to diminish as shown in FIG. 8(d). The driving wheel which continues to slip enters into the running state of the mode $B_2$ shown in FIG. 6 at a time point $t_2$. In the mode $B_2$, the control output $I_{C1}$ of the control divice 26 vanishes as shown in FIG. 8(c), and thereby the output $I_d$ of the delay element 32 is gradually decreased as shown in FIG. 8(b). Accordingly, the reference $I_p-I_d$ increases toward the maximal current instruction $I_{pmax}$, and the armature current $I_M$ of the driving motor also increases in response thereto. If the condition of the rail surface is not improved and hence the limit value $f_{max}$ of the traction force is not yet recovered, slippage occurs again at a time point $t_3$ when the peripheral driving force $F_M$ of the driving wheel, which is increased in accordance with the increase of the armature current $I_M$, is just exceeding the limit value $f_{max}$ of the traction force determined by the condition of the rail surface at that time. After the second occurence of slippage, the same operation as described above is repeated. If the limit value $f_{max}$ of the traction force is not still recovered and the current instruction $I_p$ is maintained as high as ever, i.e. at its maximal value $I_{pmax}$, a third slippage condition occurs at a time point $t_4$, as shown in FIG. 8(d). If, however, the condition of the rail surface is improved and hence the limit value $f_{max}$ of the traction force increases during the recovery operation of the third occurence of slippage, the current instruction $I_p$ is increased to reach its maxinal value $I_{pmax}$, as shown in FIG. 8(a). Thereafter, the vehicle is accelerated with a certain relative velocity $v_s$ between the vehicle velocity v and the peripheral velocity $v_M$ of the driving wheel, as shown in FIG. 8(d).

As is shown in FIG. 8 and described above, in case the limit value $f_{max}$ of the traction force is suddenly diminished stepwise so that the first slippage occurs at the time point $t_1$, the relative velocity $v_s$ is relatively large because of a large difference $\Delta F$ between the peripheral driving force $F_M$ produced by the driving wheel at that time and the limit value $f_{max}$ so that the diminishing amount of the reference $I_p-I_d$ for the readhering is made larger. However, in the slips subsequent to the first one, the relative velocity $v_s$ can be made smaller because the difference between the peripheral driving force $F_M$ of the driving wheel and the limit value $f_{max}$ is almost equal to zero and thus the reference $I_p-I_d$ can be made to sufficiently approximate a value corresponding to the limit value $f_{max}$. As described above, the present embodiment has a feature that the traction force is controlled so as to always approximate the maximal traction force $f_{max}$ in response to the increase and decrease of the limit value $f_{max}$ of the traction force.

Further, the delay element 32 of the present embodiment is provided for the main purpose of gradually increasing the driving torque $T_M$ in the state mode $B_2$ and thus should be an operating means which serves to swiftly increase its output during the period of generating the control output $I_{C1}$ for diminishing the driving torque and to gradually diminish its output when the control output $I_{C1}$ is zero. Such an operation can be carried out by using an operational amplifier, and further, it is easy to accomplish such an operation with a microprocessor. The only function of this delay element is simply to output said operational result as the signal $I_d$ to the substractor 34.

The embodiments described heretofore have the function of making the control device 26 generate the control output $I_{C1}$ only for weakening the driving torque $T_M$ (cf. FIG. 8(c)). Next, there will be described another embodiment, in which the control output $I_{C1}$ is provided not only for weakening the driving torque $T_M$, but also for recovering it, so that the traction force f is made to always converge to the maximal value $f_{max}$ available at that time.

Figure 9:
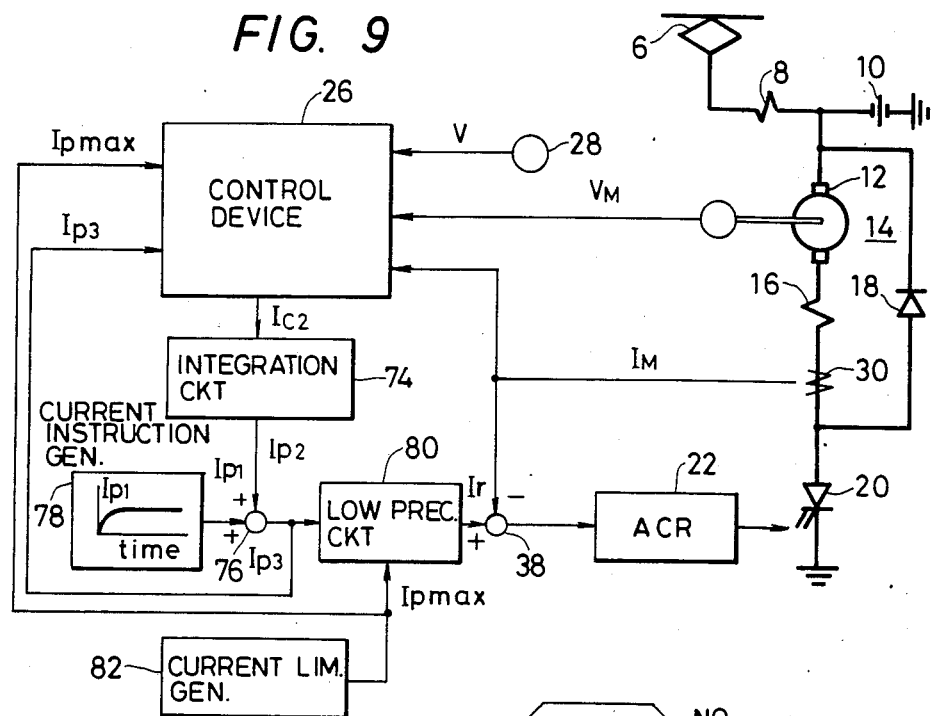
FIG. 9 schematically shows an arrangement of another embodiment according to the present invention, which is also applied to a chopper control electric vehicle.

FIG. 9 shows the overall block diagram of the another embodiment explained above. In this figure, like parts are identified by the same reference numerals as those in FIG. 2. The control device 26 serves to accomplish the operation for obtaining a control output $I_{C2}$ bringing the traction force to its maximal value by using the peripheral velocity $v_M$ of the driving wheel, the vehicle velocity v, the armature current $I_M$, a subsequent current instruction $I_{p3}$ and a current limit instruction $I_{pmax}$. The control output $I_{C2}$ is coupled to an integration circuit 74 which integrates the control output $I_{C2}$ to produce a current instruction $I_{p2}$. An adder 76 serves to add the current instruction $I_{p2}$ to a current instruction $I_{p1}$ which is the output of a current instruction generator 78. The current instruction $I_{p3}$ which is the output of the adder 76 is coupled to a low-precedence circuit 80. The low-precedence circuit 80 serves to compare the current instruction $I_{p3}$ with the current limit instruction $I_{pmax}$ which is the output of a current limit generator 82 and to generate the smaller one as a current reference $I_r$ for the driving motor control system composed of the chopper 20, the ACR 22, the subtracter 38 and the current transformer 30. Consequently, the armature current $I_M$ is controled so as to have a value corresponding to the current reference $I_r$ and thus the torque of the driving motor 14, that is, the driving torque $T_M$ of the driving wheel, is controlled. The current instruction $I_{p1}$ is a current instruction for raising the driving motor current and thus, for example, it is set at a value of current which produces such a small driving torque that the slip is not caused even though the friction coefficient $\mu$ between the driving wheel and the rail falls down to 0.1–0.15.

The control device 26 is almost similar to that shown in FIG. 4. It differs from that of FIG. 4 in that the current limit instruction $I_{pmax}$ and the current instruction $I_{p3}$ are supplied thereto and these signals are A-D converted and then employed for the logical operation.

Figure 10:
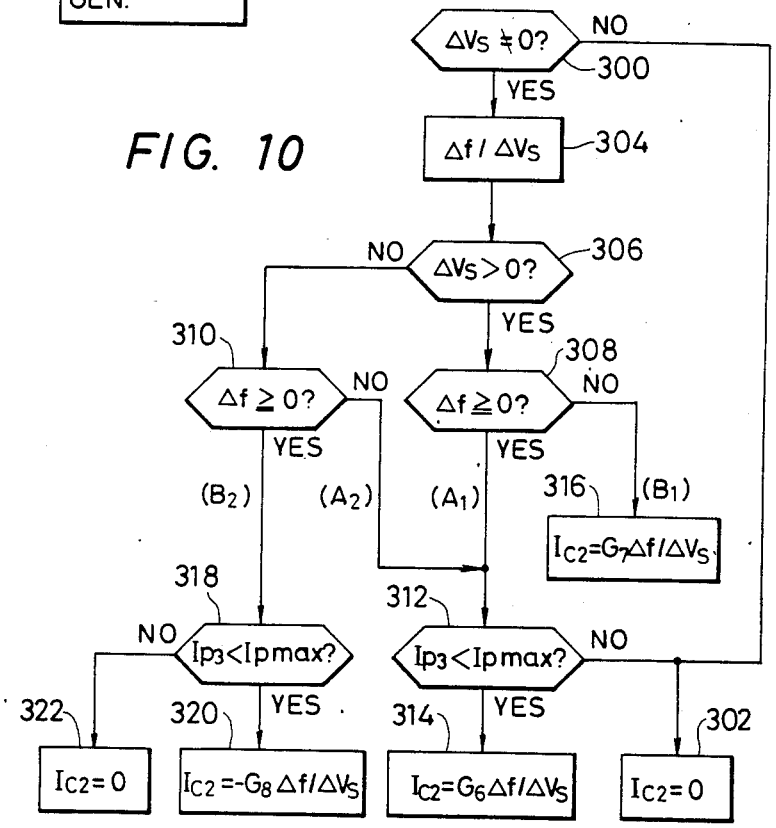
FIG. 10 is a flow chart showing still another example of the operation of the logical operation unit included in the control device shown in FIG. 4.

FIG. 10 is a flow chart of the logical operation of the operation unit 72 (FIG. 4) of the control device 26 in a case of the present embodiment. As shown in this figure, in the present embodiment the mode of the running is discriminated to be either one of $A_1$, $A_2$, $B_1$ and $B_2$ on the basis of the polarities of the difference $\Delta v_s$ of the relative velocity and the difference $\Delta f$ of the traction force (refer to FIG. 6 with regard to $A_1$, $A_2$, $B_1$ and $B_2$). First of all, it is determined at a step 300 whether or not the difference $\Delta v_s$ is zero. When $\Delta v_s=0$, the operation jumps to a step 302, in which the control output $I_{C2}$ is made zero, similarly to the cases as shown in FIGS. 5 and 7. Therefore, the integration circuit 74 maintains the current instruction $I_{p2}$. If the difference $\Delta v_s$ is not zero, i.e. where the answer at the step 300 is affirmative, the changing rate $\Delta f/\Delta v_s$ is calculated at a step 304. Thereafter, it is determined at a step 306 whether or not the difference $\Delta v_s$ is positive. Next, in steps 308 and 310 the polarity of the difference $\Delta f$ is determined for both cases of $\Delta v_s>0$ and $\Delta v_s<0$. As a result of this two step discrimination, if the relation of $\Delta v_s>0$ and $\Delta f \geq 0$ is established, it means that the mode of the running state is the mode $A_1$, and if the relation of $\Delta v_s<0$ and $\Delta f<0$ is established, it means the running state is in the mode $A_2$. In either event, both cases mean that the running state of the driving wheel is in the creep state. Therefore, in these states, the control output $I_{C2}$ ($=G_6 \cdot \Delta f/\Delta v_s$, $G_6$: a positive constant) which serves to increase the armature current $I_M$, is produced under the condition that the current instruction $I_{p3}$ does not exceed the current limit instruction $I_{pmax}$ (cf. steps 312 and 314). The control output $I_{C2}$ of the control device 26 in this case is a positive value, and hence, the current instruction $I_{p2}$ as the output of the integration circuit 74 increases. Consequently, the current instruction $I_{p3}$ as the output of the adder 76 is also increased, which becomes the reference $I_r$ for the driving motor control system through the low-precedence circuit 80. If the current instruction $I_{p3}$ exceeds the current limit instruction $I_{pmax}$ as the result of a continuous increase of the current instruction $I_{p2}$, the low-precedence circuit 80 produces the current limit instruction $I_{pmax}$ as the reference $I_r$ in place of the current instruction $I_{p3}$.

Returning to the step 308, if the difference $\Delta f$ is judged to be negative, the operation goes to a step 316. In this case, the driving wheel runs in the running state of the mode B, and the relative velocity $v_s$ continues to increase. Therefore, the armature current $I_M$ must be diminished rapidly so that the driving torque $T_M$ is made to decrease. To this end, the control output $I_{C2}$ ($=G_7 \cdot \Delta f/\Delta v_s$, $G_7$: a positive constant) is coupled to the integration circuit 74. Since the control output $I_{C2}$ in this case is a negative value, the output of the integration circuit 74, i.e. the current instruction $I_{p2}$, decreases. Thereby the current instruction $I_{p3}$ is diminished. Further, when the relation of $\Delta f \geq 0$ is established at the step 310, the operation proceeds to a step 318. This case means that the running state of the driving wheel is in the mode $B_2$, i.e. that the relative velocity $v_s$ starts to decrease. As explained above, in this case, the armature current $I_M$ is to be increased so gradually as to prevent the reoccurrence of slippage in view of the effective utilization of the adhesive force. Then, in this case, the positive control output $I_{C2}$ ($-G_8 \cdot \Delta f/\Delta v_s$, $G_8$: a positive constant) is produced under the condition that the current instruction $I_{p3}$ does not exceed the current limit instruction $I_{pmax}$ (cf. steps 318 and 320). The current instruction $I_{p2}$ generated from the integration circuit 74 increases due to the positive control output $I_{C2}$, so that the current instruction $I_{p3}$ also increases. In case the current instruction $I_{p3}$ exceeds the current limit instruction $I_{pmax}$ in the mode $B_2$ of the running state, that is, when the answer in the step 318 is negative, the control output $I_{C2}$ becomes zero and the current limit instruction $I_{pmax}$ is generated from the low-precedence circuit 80 as the reference $I_r$.

Figure 11:
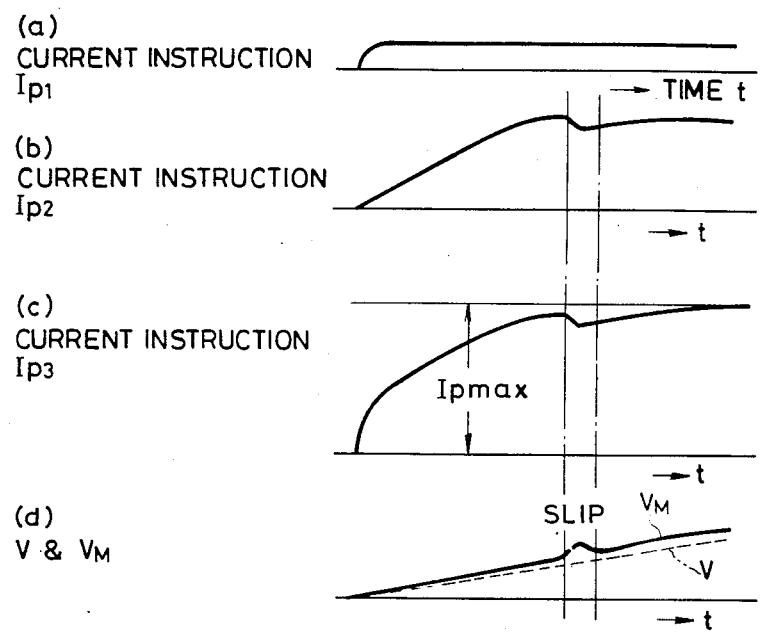
FIG. 11 is an explanatory view showing the operation of the embodiment shown in FIG. 9.

FIG. 11 shows the changes of the respective current instructions $I_{p1}$, $I_{p2}$, $I_{p3}$, the vehicle velocity v and the peripheral velocity $v_M$ of the driving wheel with respect to time in the above stated embodiment. Further, it is assumed here that the current instruction $I_{p3}$ is smaller than the current limit instruction $I_{pmax}$. As has been already described, the current instruction $I_{p1}$ (cf. FIG. 11(a)) has a value corresponding to such a small driving torque as barely causes the slip in the normal state of the rail surface. This current instruction $I_{p1}$ makes the driving motor current $I_M$ increase and, thereby, the traction force f and the relative velocity $v_s$ are generated. At first, in the state mode $A_1$, the changing rate $\Delta f/\Delta v_s$ is relatively large. Thus, the current instruction $I_{p2}$ is increased as time passes (cf. FIG. 11(b)) and thus the current instruction $I_{p3}$ is also increased (cf. FIG. 11(c)), so that the driving torque $T_M$ increases. When the traction force f approximates its maximal value $f_{max}$, the changing rate $\Delta f/\Delta v_s$ is diminished and the increasing rate of the current instruction $I_{p2}$ is reduced in accordance with the reduction of the changing rate $\Delta f/\Delta v_s$. The relationship of $\Delta f/\Delta v_s=0$ occurs, when the traction force f reaches the $f_{max}$ point and the increasing rate of the current instruction $I_{p2}$ is zero. Namely, the current instruction $I_{p2}$ converges to the value corresponding to the maximal traction force $f_{max}$. If the temporary change of the running conditions causes the slippage and the running state is changed to the mode $B_1$, the current instruction $I_{p2}$ is abruptly diminished so that the driving torque $T_M$ is reduced. Consequently, the relative velocity $v_s$ starts to diminish and the running state is changed to the mode $B_2$. In the mode $B_2$, as explained above, the current instruction $I_{p2}$ is gradually increased so that the driving torque $T_M$ gradually increases also. Thus, the relative velocity $v_s$ continues to decrease. When the relative velocity $v_s$ is made smaller than such a relative velocity as causes the maximal traction force $f_{max}$ and the running state enters the mode $A_2$, the current instruction $I_{p2}$ swiftly increases. Thus, the relative velocity $v_s$ starts to increase again, and the running state enters mode $A_1$ in which the current instruction $I_{p2}$ continues to increase and converges to the point of $\Delta f/\Delta v_s=0$, supplying the maximal traction force $f_{max}$, again. The current instruction $I_{p3}$ is the sum of $I_{p1}$ and $I_{p2}$ (when $I_{p3}<I_{pmax}$) and serves to control the driving torque $T_M$ so as to accelerate the driving wheel with such a relative velocity as supplies the maximal traction force $f_{max}$. Next, when the maximal traction force $f_{max}$ is sufficiently large as is the case with the dry surface of the rail, the current instruction $I_{p3}$ continues to increase up to the current limit instruction $I_{pmax}$. When it reaches the current limit instruction $I_{pmax}$, the low-precedence circuit 80 (FIG. 9) serves to keep the reference $I_r$ at the current limit instruction $I_{pmax}$. When the condition of the rail surface is wrongly changed to cause slippage and the running state becomes the mode $B_1$, the control output $I_{C2}$ goes negative, so that the current instruction $I_{p2}$ is reduced and the current instruction $I_{p3}$ is also decreased. As a result, the relation of $I_{p3} < I_{pmax}$ immediately occurs and slippage is swiftly prevented.

As described above, the control device of the present embodiment has the advantage that the frequency of slippage is further reduced since the traction force always converges on its maximal value $f_{max}$.

Furthermore, in the embodiment shown in FIG. 9, a signal in proportion to the changing rate $\Delta f/\Delta v_s$ is generated as the control output $I_{C2}$, but it should not be limited to this. There can be employed any signal which serves to swiftly increase the current instruction $I_{p2}$ in the state modes $A_1$ and $A_2$, to rapidly diminish the current instruction $I_{p2}$ in the mode $B_1$ and to gradually increase the current instruction $I_{p2}$ in the mode $B_2$. For example, the following signals can be considered in relation to the mode $B_1$:

(1) $I_{C2} = -G_9 \cdot v_s$ (in proportion to the relative velocity $v_s$)

(2) $I_{C2} = -G_{10} \cdot \Delta v_M$ (in proportion to the difference $\Delta v_M$ of the peripheral velocity of the driving wheel)

(3) $I_{C2} = -G_{11} \cdot \Delta v_s$ (in proportion to a difference $\Delta v_s$ of the relative velocity)

(4) $I_{C2} = g_{12} \cdot \Delta f$ (in proportion to a difference $\Delta f$ of the traction force)

(5) $I_{C2} = -C_2$ (constant value)

The following signals can be considered in relation to the mode $B_2$:

(1) $I_{C2} = G_{13} \cdot v_s$ (in proportion to the relative velocity $v_s$)

(2) $I_{C2} = -G_{14} \cdot \Delta v_M$ (in proportion to the difference $\Delta v_M$ of the peripheral velocity)

(3) $I_{C2} = -G_{15} \cdot \Delta v_s$ (in proportion to the difference $\Delta v_s$ of the relative velocity)

(4) $I_{C2} = G_{16} \cdot \Delta f$ (in proportion to the difference $\Delta f$ of the traction force)

(5) $I_{C2} = C_3$ (constant value)

The following signals are considered in relation to the state modes $A_1$ and $A_2$:

(1) $I_{C2} = G_{17} \cdot |\Delta f|$ (in proportion to an absolute value of the difference $\Delta f$)

(2) $I_{C2} = C_4$ (constant value)

Figure 12:
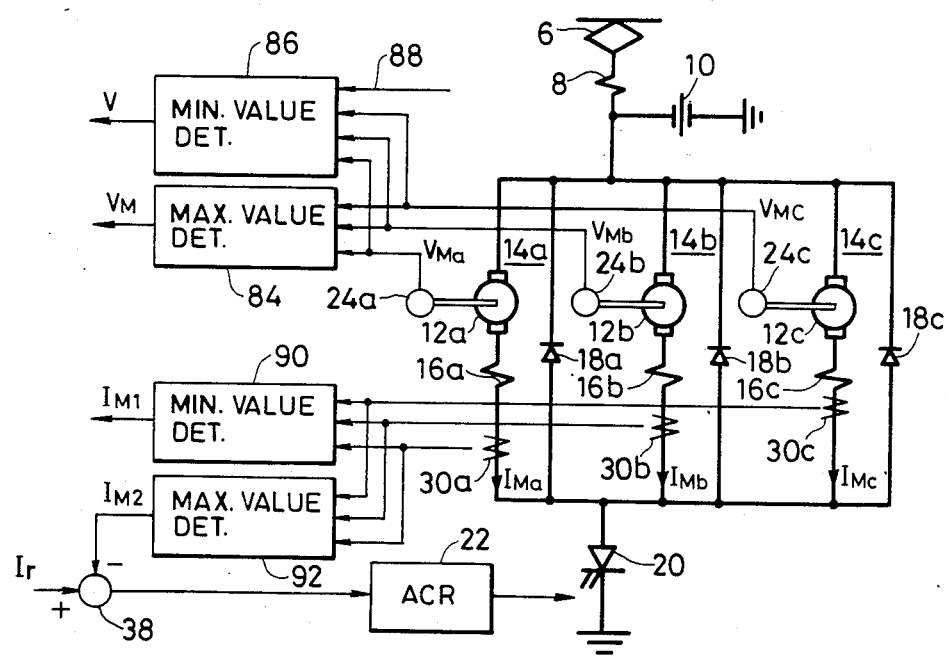
FIG. 12 schematically shows an arrangement of still another embodiment where the present invention is applied to an electric vehicle which has plural driving motors connected in parallel and controlled by a chopper.

In the embodiments described above, a main circuit of the electric vehicle having one driving motor 14 has been shown. Next, the case where the present invention is applied to an electric vehicle which has a plurality of the driving motors will be described. FIG. 12 shows an example of a main circuit of the electric vehicle where one chopper serves to control three driving motors connected in parallel. For example, in a case of an electric locomotive with 6 driving shafts, there are many cases of employing the system of dividing the driving motors into two groups, three by three, providing one chopper in each group and independently controlling each group. FIG. 12 shows an embodiment for the electric locomotive described above and one of two driving motor groups.

In this figure, reference characters 12a, 12b and 12c denote armatures of respective driving motors 14a, 14b and 14c, and 16a, 16b and 16c denote field windings thereof. As shown in the figure, three driving motors 14a, 14b and 14c are connected in parallel, and armature currents thereof are controlled by one chopper device 20. Reference characters 18a, 18b and 18c indicate free wheel diodes in relation to the respective driving motors 14a, 14b and 14c. Reference characters 24a, 24b and 24c denote tachogenerators mounted on axles driven by the motors 14a, 14b and 14c respectively, and outputs thereof correspond to the peripheral velocity $v_M$ of the driving wheels driven by the motors 14a, 14b and 14c respectively. A reference numeral 84 denotes a maximal value detecting circuit, which serves to generate a maximal value among the input signals $v_{Ma}$, $v_{Mb}$ and $v_{Mc}$. This output is employed as the peripheral velocity $v_M$ in the embodiments shown in FIGS. 2 and 9. A reference numeral 86 indicates a minimal value detecting circuit which receives an output signal 88 of a minimal value detecting circuit (not shown) provided for the other group of the driving motors as well as the signals $v_{Ma}$, $v_{Mb}$ and $v_{Mc}$ from the tachogenerators 24a, 24b and 24c, and serves to generate a signal of a minimal value thereamong. This output is employed as the vehicle velocity v in the embodiments shown in FIGS. 2 and 9. Reference characters 30a, 30b and 30c denote current transformers for detecting armature currents $I_{Ma}$, $I_{Mb}$, and $I_{Mc}$ of the respective driving motors 14a, 14b and 14c. A reference numeral 90 denotes a minimal value detecting circuit, which serves to output as $I_{M1}$ a minimal value of the input signals $I_{Ma}$, $I_{Mb}$ and $I_{Mc}$. This output is employed as the armature current $I_M$ in the embodiments shown in FIGS. 2 and 9. The thus obtained vehicle velocity v, peripheral velocity $v_M$ and armature current $I_{M1}$ can be coupled to the control divice 26, in which the traction force f, the relative velocity $v_s$ and the differences $\Delta f$, $\Delta v_s$ thereof are obtained in the same manner as those in the embodiments described above. A result of the operation in the control device 26 is used as the control output $I_{C1}$ in the circuit arrangement of FIG. 2 or the control output $I_{C2}$ in that of FIG. 9.

There is further provided in this embodiment a maximal value detecting circuit 92, which receives the detected armature currents $I_{Ma}$, $I_{Mb}$ and $I_{Mc}$ and generates a signal corresponding to the maximal armature current as an armature current $I_{M2}$. This armature current signal $I_{M2}$ is coupled to the subtracter 38, in which the deviation of the armature current $I_{M2}$ from the reference $I_r$ obtained as a result of the operation mentioned above is calculated. In accordance with the deviation, the ACR 22 controls the chopper 20. Further, the feedback signal $I_{M2}$ of the armature current applied to the subtracter 38 utilizes the output of the maximal value detecting circuit 92, that is, the maximal value of the armature currents $I_{Ma}$, $I_{Mb}$ and $I_{Mc}$ in the respective driving motors 14a, 14b and 14c, but it can utilize an average value $(I_{Ma} + I_{Mb} + I_{Mc})$.

As descried above, the present embodiment is designed to obtain the relative velocity $v_s$, the traction force f and the differences $\Delta v_s$ and $\Delta f$ thereof, setting a minimal value of the detected peripheral velocities of all the driving wheels as the vehicle velocity v, setting a maximal value of the detected peripheral velocities of the driving wheels in respective groups as the peripheral velocity $v_M$ of the slipping driving wheel and setting a minimal value of the detected armature currents in respective groups as the armature current $I_M$. Further this embodiment is designed to control the traction force f to always approximate its maximal value $f_{max}$ in the same way as the embodiment described before. The maximal value of the peripheral velocities of the driving wheels in respective groups and the minimal value of the armature currents can be regarded as respective values with respect to the driving wheel with the maximal relative velocity. Thus, the present embòdiment is designed to choose the driving wheel with the maximal relative velocity as a representative driving wheel and to control the traction force f of the driving wheel to approximate to its maximal value $f_{max}$. With respect to the driving wheels belonging to one group, the difference of the traction force f between respective driving wheels, especially that of the relative velocity $v_s$ bringing the traction force f to its maximal value therebetween, is generally small. Thus, by that method, it is possible to make the traction force f of respective driving wheels in one group nearly approximate to the maximal value $f_{max}$. The present embodiment has the advantage that the device is simple and inexpensive.

In the embodiments described heretofore, the control device 26 executes the operation so as to obtain the traction force f produced at that time and to provide the control output $I_{C1}$ or $I_{C2}$ in accordance with the obtained traction force f. However, in place of such a traction force f, the driving torque $T_M$ corresponding to the first term of the right-hand side of the formula (1) or the armature current $I_M$ corresponding to the driving torque $T_M$ can be employed for the same control as that described above. This will be understood from studying the coincidence between the polarity of the difference $\Delta f$ of the traction force and that of the difference $\Delta T_M$ of the peripheral driving torque of the driving wheel. At first, as is shown in FIG. 6, the modes $A_1$ and $A_2$ of the running state belong to the creep zone where the relative velocity $v_s$ is small, and in this zone the driving wheels are usually regarded as being in the adhesion state. Since, therefore, the value of the second term in the right-hand side of the formula (1) is so small as to be negligible, $f \approx T_M/f$. Thus, the differences have the same relation of $\Delta f \approx \Delta T_M/r$ therewith and hence the polarities of $\Delta f$ and $\Delta T_M$ are similar to each other. Next, the modes $B_1$ and $B_2$ of the running state belong to the slip (or skid) zone, where the second term in the right-hand side of the formula (1) is about 10 times as large as that in the creep zone and thus cannot be ignored. The mode $B_1$, as shown in FIG. 6, indicates that the running state in which the relative velocity $v_s$ is increasing. The increase of the relative velocity $v_s$ brings about increase in a counter electromotive force in the driving motor. As a result, the armature current $I_M$ of the driving motor is diminished and thus the driving torque $T_M$ is also diminished. This means that $\Delta T_M < 0$, and since $\Delta f < 0$ is in the mode $B_1$ as shown in FIG. 6, the differences $\Delta f$ and $\Delta T_M$ have the same negative polarity. Next, in the mode $B_2$, as shown in FIG. 6, the relative velocity $v_s$ is diminished and thus the counter electromotive force of the driving motor is decreased. Thus, the armature current $I_M$ is increased and thus the driving torque $T_M$ is also increased. This $\Delta T_M > 0$, and since $\Delta f > 0$ in the mode $B_2$, $\Delta f$ and $\Delta T_M$ have the same positive polarity.

Moreover, consider again the situation when the rail surface is changed from wet to dry. In this case, the relative velocity $v_s$ is diminished and thus the counter electromotive force of the driving motor is also diminished. As a result, the armature current $I_M$ is increased and thus the driving torque $T_M$ is also increased. The relationship of $\Delta f > 0$ is established in this case and thus the differences $\Delta f$ and $\Delta T_M$ have the same positive polarity. In fact, the response of the change in the armature current $I_M$ caused by a change in the counter electromotive force of the driving motor is delayed somewhat on account of a delay factor such as the inductance of the motor winding. The magnitude of a change of the armature current fluctuates on account of the resistance of the motor circuit, the presence or absence of a motor current feedback for controlling constant current, constants of a control system and the like. The magnitude of the change thereof is large in the case where there exists no current feedback and the resistance of the motor circuit is small. Considering the second term in the right-hand side of the formula (1), the traction force f can be obtained irrespective of factors such as the constants of the motor circuit and the presence or absence of the current feedback.

As is described above, since in every mode of the running state both the differences $\Delta f$ and $\Delta T_M$ have the same polarity, the operation of the control device 26 can be realized by substituting the difference $\Delta T_M$ of the driving torque for that $\Delta f$ of the traction force. As is well known, the driving torque $T_M$ depends on the armature current $I_M$ and hence the operation of the control device 26 can be also achieved by the difference $\Delta I_M$ of the armature current. By using these methods, the device can be made simpler.

In the above described embodiments, the armature current is fed back to the subtracter 38, 28 so as to automatically control the armature current $I_M$ to be a value corresponding a current instruction, but this armature current feedback is not indispensable to the present invention. The present invention can be applied to an electric vehicle which does not have this feedback. Further, there is described the case where a tachogenerator is mounted in a driven wheel shaft as a detecting means for the vehicle velocity; however, it is possible to employ another method such as a detecting method for the velocity relates to the ground by doppler radar.

Further, the foregoing description was developed as taking an example of the slippage phenomenon when power running, but it is evident that this invention can be applied to the skid phenomenon when braking. In the latter case, in consideration of $v > v_M$, the calculation unit for the relative velocity should be changed to accomplish the operation of $v_s = v - v_M$. Further, with respect to a driving system, any system can be employed. For example, a control device should not be defined as a chopper control system. It can employ a phase control system or an inverter control system. An induction motor can be also utilized as the driving motor in place of the direct current motor as described above. The invention can be also applied to a diesel-electric vehicle.

Although we have herein shown and described some forms of apparatus and control methods embodying the present invention, it should be understood that various changes and modifications other than those as mentioned above may be made therein within the scope of the appended claims without departing from the spirit and scope of the present invention.

We claim:

1. A method of controlling an electronic driving motor for driving a vehicle by controlling the force between a drive wheel and a rail on which the vehicle travels comprising the steps of:

(a) monitoring the relative velocity of the periphery of said drive wheel with respect to the velocity of said vehicle and generating a first signal representative of said relative velocity;

(b) generating a second signal representative of the rate of change of said relative velocity as represented by said first signal;

(c) monitoring the rate of change of force acting between said driving wheel and said rail and generating a third signal representative thereof;

(d) in response to the polarity of the rate of change of relative velocity as represented by said second signal differing from the polarity of the rate of change of force acting between said driving wheel and said rail as represented by said third signal, generating a fourth signal for decreasing the force between said driving wheel and said rail.

2. A method according to claim 1, wherein step (d) comprises generating said fourth signal response to the polarity of said second signal being representative of a positive rate of change of relative velocity.

3. A method according to claim 1, further including the step of (e) coupling said fourth signal through a delay element having a time constant which is relatively small for an increasing portion of said fourth signal and is relatively large for a decreasing portion of said fourth signal.

4. A method according to claim 1, further including the step of (e) in response to said second signal being representative of a negative rate of change of relative velocity and said third signal being representative of a positive rate of change of the force acting between said driving wheel and said rail, generating the fifth signal for increasing the force between said driving wheel and said rail.

5. A method of controlling an electric driving motor in a vehicle for driving rolling stock having first means for controlling the force acting between a wheel and a rail in accordance with a current reference signal generated on the basis of an instruction, second means for detecting the difference between a peripheral velocity of the wheel and vehicle velocity, third means for discriminating an unallowable nonadhesive state of running of the wheel when the velocity difference detected by the second means exceeds a certain value to generate a compensating signal for decreasing the value of the current reference signal applied to the first means so that the force acting between the wheel and the rail is reduced; wherein the compensating signal is obtained by the following steps:

calculating the rate of change of the velocity difference with respect to time;

calculating the rate of change of the force acting between the wheel and the rail with respect to time; and generating said compensating signal for decreasing the current reference when the polarity of the rate of change of the relative velocity is different from that of the rate of change of the force acting between the wheel and the rail.

6. A control method as defined in claim 5, wherein the compensating signal for decreasing the value of the current reference signal is generated only when the rate of change of the relative velocity is positive.

7. A control method as defined in claim 5, wherein the compensating signal is passed through a delay element which has a small time constant when the compensating signal increases and a relatively large time constant when the compensating signal decreases.

8. A control method as defined in claim 5, wherein the compensating signal is generated to increase the value of the current reference signal, when the rate of change of the velocity difference is negative and the rate of change of the force acting between the wheel and the rail is positive.

* * * * *